SIMON P. GRAHAM.

Improvement in Carriage Bodies and Seats.

No. 4,780. Reissued March 5. 1872.

Attest.
Philip M. Shung
J. Turbig

Simon P. Graham
Inventor.

Assignees { Theodore Comstock, Henry F. Booth, Orsel Booth, per Fisher & Fisher, attys in fact

THE ECKERT LITHOGRAPHING CO., WASHINGTON, D. C.

UNITED STATES PATENT OFFICE.

SIMON P. GRAHAM, OF LONDON, CANADA, ASSIGNOR, BY MESNE ASSIGNMENTS, TO THEODORE COMSTOCK, EZRA BOOTH, AND HENRY F. BOOTH, OF COLUMBUS, OHIO.

IMPROVEMENT IN CARRIAGE BODIES AND SEATS.

Specification forming part of Letters Patent No. 95,466, dated October 5, 1869; reissue No. 4,780, dated March 5, 1872.

SIMON P. GRAHAM, formerly of the city of Columbus, county of Franklin, State of Ohio, and now of London, in the province of Ontario and Dominion of Canada, has invented certain new and useful Improvements in Carriage Body and Seats, of which the following is a specification:

His invention relates to a carriage-seat which is constructed of wood and sheet metal, by the combination of which materials a strong, light, and durable structure is obtained; and it consists in the special construction of the seat and the parts which compose the seat.

Figure 1:
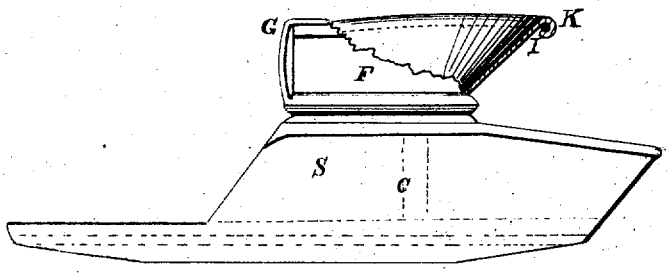
Figure 2:
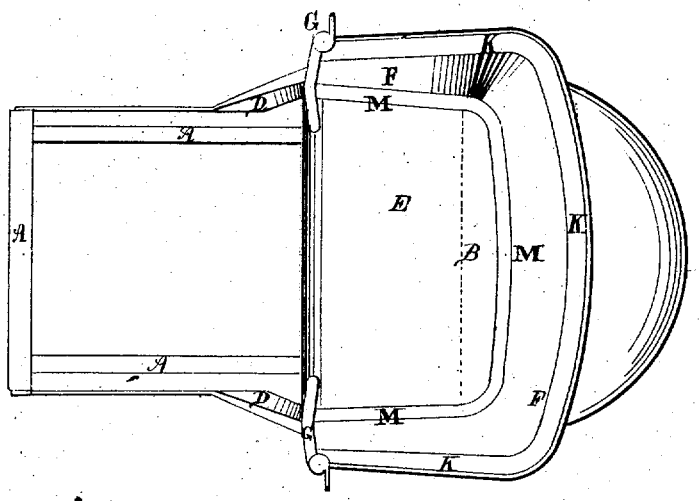
Figure 3:
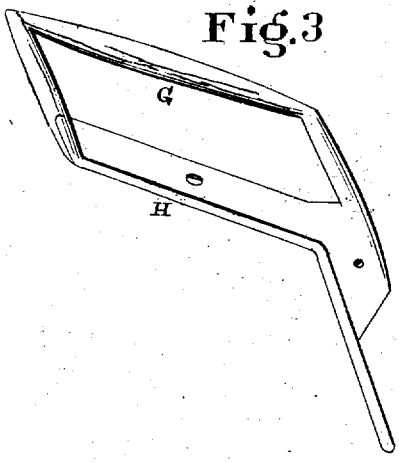
Figure 4:
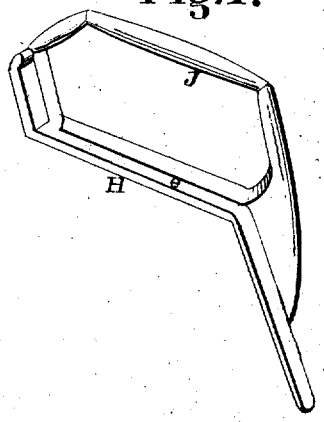

In the accompanying drawing, Figure 1 is a side view of a carriage-body and seat; Fig. 2, a view of the top; and Figs. 3 and 4 are detached sections.

In Fig. 2, A represents the sills of the body, which are constructed of wood in the ordinary way. B, indicated by the dotted lines, is a cross-beam, supported by the standard C, also indicated by dotted lines in Fig. 1. Said beam and standard, together with the front standards D, support the seat, and, together with the sills referred to, make up the frame-work of the carriage. To said frame-work is attached the sides or panels S of the body, said panels being constructed of thin sheet-iron—the sides and back being one entire piece, and bolted or otherwise secured to the frame in a strong and substantial manner. The sides and back may consist of several pieces, in which case they are joined by any ordinary lock-joint, or by riveting the sections together. The upper or top panel in the rear of the seat is connected to the sides by an ordinary folding or lock-joint.

A body thus constructed is not only much lighter than one made entirely of wood, but it is also much stronger and more durable, as it cannot warp and crack by exposure and usage.

The seat is constructed in like manner of wood and sheet metal, the bottom E being wood, and the back and sides F sheet metal, the back and sides F consist of one entire piece of sheet metal, or it may be made up in sections, if so desired, as described of the body. The bottom edge of the sides and back of the seat is turned inward horizontally, so as to form a flange, M, which latter rests upon the top of the bottom of the seat, and is attached thereto by bolts or otherwise. The flange serves not only to attach the sides and back to the bottom, but stiffens and strengthens said sides and back. The sides of the seat are attached to the front part of the seat-bottom by the corner-irons G or J, a detached view of which is shown in Figs. 3 and 4. H, the upright section which forms the corner of the seat, is made concave on the inner side, and convex on the outer, thereby forming a smooth rounded edge to the corners of the seat, and to which they are riveted in a neat and permanent manner. Said corner-irons not only serve to attach the back to the bottom of the seat by reaching out onto the bottom and up the side as an angle-iron, but at the same time answer the place of handles, to assist the riders into the carriage. J, Fig. 4, represents a handle or corner-iron, in which is formed a groove or channel, *e*, for the admission of the ends of the seat-back, thereby dispensing with the use of rivets, as is required on using that shown in Fig. 3.

It will be observed that the upper edge of the seat-back is turned over, forming a flange-like projection or rim, K. This flange or rim serves to stiffen and strengthen the seat-back. To the under side of this flange or rim may be attached a fillet, I, Fig. 1, when the flange is bent around and underneath said fillet, holding the latter firmly in its place. A portion of the side of the seat is represented as being broken away in order that it may be seen. Said fillet is for the purpose of giving greater strength and stiffness to the rim.

This seat may be used on either wood or iron bodies, without regard to the peculiar construction of said bodies.

In the construction of the above-described body and seat he does not confine himself to any particular style or shape of the panels, which are susceptible of many variations and modifications.

What is claimed as the invention of said GRAHAM, and desired to be secured by Letters Patent, is—

1. A carriage-body of which the sides and back are made of one entire piece of sheet metal, for the purposes specified.

2. A carriage-body made of sheet metal, formed in parts or sections, substantially as and for the purposes specified.

3. A carriage-seat the back and sides of which are made of one or more pieces of sheet metal, substantially as and for the purposes specified.

4. The carriage-seat herein described as an article of manufacture, composed of the metal back and sides F, flange M, bottom E, handle and angle-irons G or J, flange K, and fillet I, all constructed in the manner substantially as described.

5. The flange or curved rim on the upper edge of the seat-back, for the purpose of giving strength and stiffness to the back, substantially as described.

6. In combination with the seat-back F, the flange or curved rim K, formed substantially as and for the purposes specified.

7. The fillet I, in combination with the rim K of the seat-back, substantially as and for the purpose specified.

8. The combined handle and double corner-iron G, substantially as and for the purposes specified.

9. The combined handle and corner-iron J, constructed with the groove *e*, substantially as and for the purposes specified.

10. The flange M upon the bottom of the seat-back, substantially as and for the purposes specified.

THEODORE COMSTOCK.
EZRA BOOTH.
HENRY F. BOOTH.

Witnesses:
HENRY HEINMILLER,
L. E. WILSEN.